G. C. Manner.

Piano-Forte.

No 3004

Reissued Jun. 23, 1868.

Witnesses

F. A. Jackson.

Chas. Frisch.

Inventor G. C. Manner

Per Munn & Co Attys

UNITED STATES PATENT OFFICE.

G. C. MANNER, OF NEW YORK, N. Y.

IMPROVEMENT IN PIANO-FORTES.

Specification forming part of Letters Patent No. 59,619, dated November 13, 1866; Reissue No. 3,004, dated June 23, 1868.

*To all whom it may concern:*

Be it known that I, G. C. MANNER, of the city, county, and State of New York, have invented a new and useful Improvement in Piano-Fortes; and I do hereby declare that the following is a full, clear, and exact description thereof, which will enable others skilled in the art to make and use the same, reference being had to the accompanying drawings, forming part of this specification, in which—

Figure 2:
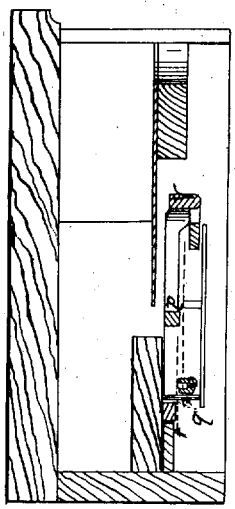
Figure 1:
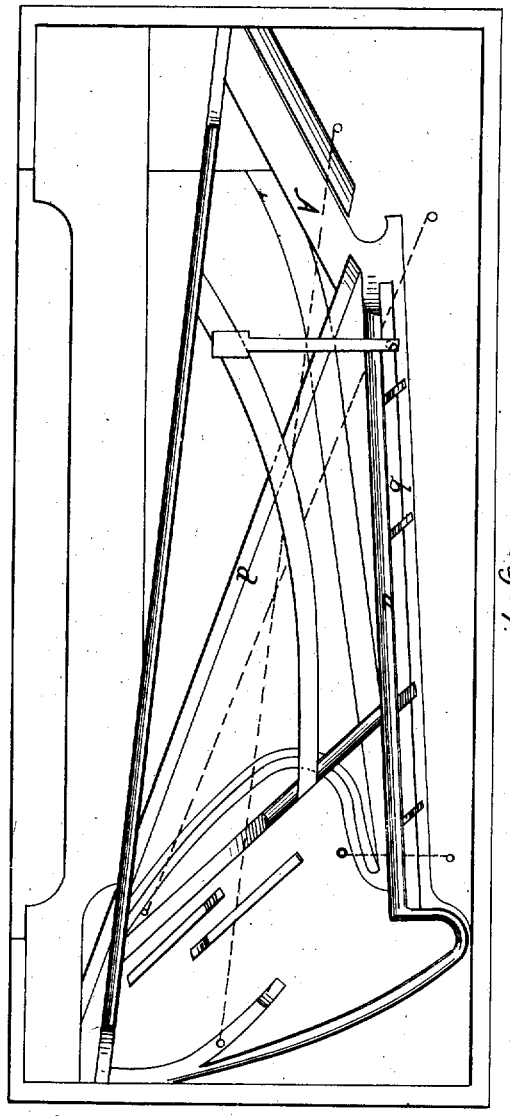

Figure 1 represents a plan or top view of this invention. Fig. 2 is a transverse vertical section of the same.

Similar letters of reference indicate corresponding parts.

This invention relates to certain improvements in the construction and arrangement of the metal frame of a piano-forte; and it consists, first, in embedding or setting the iron frame in the solid wood of the piano, so that it is butted against the wrest-plank, and so that the outer line of the iron-frame is close to and inside of the line of the tuning-pins. The object of thus sinking the frame is to gain strength, but especially to keep the tuning-pins clear of the metal frame, and to prevent the expansion and splitting of the wrest-plank. In ordinary piano-fortes the frame lies upon the wrest-plank, and the tuning-pins are fitted through holes in the frame into the wrest-plank. Thereby it becomes necessary to secure the strings to the pins at a considerable height above the wrest-plank, and consequently considerable leverage is applied to the pins, tending to pull their upper ends forward. The pins are thereby loosened after having been used but little, and come in contact with the metal edge of the surrounding frame, thus destroying the whole wrest-plank and slackening the strings, besides spoiling the tone of the instrument. By sinking the frame in the solid wood so that it is almost on a level with the wrest-plank I am enabled to use shorter tuning-pins, so that the piano is strung close to the wrest-plank, thus doing away with a leverage strain on the tuning-pin, besides obtaining greater strength of wrest-plank and frame.

The invention consists, second, in an improvement on the ordinary agraffe arrangement, by which the strings are held in position.

My device consists of a strong straight bar cast with the frame, above the level of the other parts of the frame, along the line of the tuning-pins. The under side of this bar is made concave, and holds a strip of wood, ivory, or other non-metallic substance. The lower edge of the wooden filling is somewhat below the level of the surface of the wrest-plank, and the strings are consequently depressed by this inverted wooden bridge. In the wooden bridge are arranged the bridge-pins to prevent the strings from swinging sidewise. Thus a firm support for the strings is obtained, and the same cannot be displaced by the hammer.

In ordinary piano-fortes either agraffes or simply bridge-pins are employed. The bridge-pins are not reliable, as they wear loose, allowing the string to vibrate on the bridge, giving it a jarring sound. The agraffes are also unreliable, as the holes are gradually enlarged by the motion of the strings, thereby the strings are allowed to vibrate against the inner edges of the agraffes, producing thus an unpleasant buzzing sound. None of these difficulties can occur by the use of my reversed bridge.

The invention consists, third, in the use of a diagonal brace-rod which is cast with the iron frame, and which is in line with the heavy steel stringing under the overstrung bass of an ordinary overstrung piano-forte. This bar, running from the front right-hand corner to the back left-hand corner, strengthens the case of the piano and insures the long keeping of the same.

Ordinary piano-fortes, to prevent the great strain of the steel strings from drawing the case out of shape, have to arch the back of the case, and have to place the whole frame out of level. In fact, the weakest point of every piano consists in the lack of proper bracing for the heavy steel strings, and this is the reason why so many piano-fortes are worn after short use.

Various braces have already been employed, but none in which the brace was directly in the diagonal which is drawn from the front right-hand corner to the back left-hand corner of the case.

The invention consists, fourth, in the use of a slot in the metal frame, which allows of placing the damper-lifters behind the point supporting the string, and the application of French damper-levers over the bridge is rendered practicable.

A represents the metal frame of a piano-forte, which is made in the form shown in Fig. 1 of the drawings. It is secured and embedded in the wood-work of the piano-forte in such a position that its rear edge is entirely in front of the tuning-pins, and thereby the wrest-plank is firmly supported in its position and the tuning-pins are prevented from working loose.

My frame is provided with a continuous straight bridge, *a*, which is cast with said frame, and against the lower edge of which the strings bear. This bridge is cast hollow and filled in with ivory, wood, or other suitable material, which forms the bearing-points for the strings, and thereby the iron tone is avoided, which inevitably follows if the strings bear directly against metal, and the working loose of the strings is also prevented. For the filling I use ivory by preference, since I find that by doing so the richness and brilliancy of the tone is materially enhanced.

Between the bridge *a* and the side of the frame A a slot, *b*, is left in the frame, through which work the damper-lifters behind the points supporting the string, so that the ordinary French damper-levers can be applied and carried over the bridge *a*, and thereby the construction of the mechanism of the piano-forte is materially facilitated.

The frame A is strengthened by a bar, *d*, which extends diagonally across the case and parallel to the lower steel strings. By this bar the strain of said lower steel strings is counteracted, and a comparatively light frame can be used with perfect safety.

Having thus described my invention, what I claim as new, and desire to secure by Letters Patent, is—

1. Placing the damper-lifters in a slot of the metal frame behind the point supporting the strings, substantially as and for the purpose described.

2. The metal frame A, when embedded in the wood-work of the piano-forte so as to butt against the wrest-plank, and when provided with an inverted hollow filled bridge, *a*, with a slot, *b*, and a diagonal brace, *d*, all made and operating substantially as and for the purpose herein shown and described.

G. C. MANNER.

Witnesses:
ALEX. F. ROBERTS,
A. R. HAIGHT.